United States Patent
Viault et al.

(10) Patent No.: US 10,830,276 B2
(45) Date of Patent: Nov. 10, 2020

(54) ROLLING BEARING ASSEMBLY

(71) Applicant: Aktiebolaget SKF, Gothenburg (SE)

(72) Inventors: Samuel Viault, Saint-Antoine-du-Rocher (FR); Benoît Hauvespre, Saint Etienne de Chigny (FR); Michael Wahler, Gerolzhofen (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/423,601

(22) Filed: May 28, 2019

(65) Prior Publication Data

US 2019/0390710 A1    Dec. 26, 2019

(30) Foreign Application Priority Data

Jun. 21, 2018   (DE) .................. 10 2018 210 091

(51) Int. Cl.
| | | |
|---|---|---|
| *F16C 19/06* | (2006.01) | |
| *F16C 33/44* | (2006.01) | |
| *F16C 33/62* | (2006.01) | |
| *F16C 37/00* | (2006.01) | |

(52) U.S. Cl.
CPC ............. *F16C 19/06* (2013.01); *F16C 33/44* (2013.01); *F16C 33/62* (2013.01); *F16C 37/007* (2013.01); *F16C 2204/60* (2013.01); *F16C 2206/04* (2013.01); *F16C 2206/40* (2013.01); *F16C 2208/36* (2013.01)

(58) Field of Classification Search
CPC .......... F16C 19/06; F16C 33/44; F16C 33/62; F16C 35/067; F16C 2204/60; F16C 2206/40; F16C 2208/36; F16C 37/007; F16C 2206/04

USPC ....... 384/462, 469, 474, 492, 523, 527, 532, 384/467

See application file for complete search history.

(56) References Cited

U.S. PATENT DOCUMENTS

| | | | | |
|---|---|---|---|---|
| 3,112,417 | A * | 11/1963 | Tamm .................. | H02K 5/1732 310/90 |
| 4,533,264 | A * | 8/1985 | Haugwitz ............... | F16C 33/66 384/472 |
| 5,033,874 | A * | 7/1991 | Rouse ................... | F16C 35/045 384/477 |
| 5,716,147 | A * | 2/1998 | Cook ...................... | F16C 33/62 384/492 |
| 7,736,063 | B1 * | 6/2010 | Reitz .................... | F16C 33/6688 384/462 |
| 9,206,841 | B2 * | 12/2015 | Cordier ................. | F16C 19/163 |

(Continued)

FOREIGN PATENT DOCUMENTS

| | | | | |
|---|---|---|---|---|
| DE | 4336075 | A1 * | 4/1995 | .......... F16C 33/6659 |
| DE | 102017215698 | A1 * | 3/2019 | ............. F01K 25/12 |

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

A bearing assembly including a chamber provided with a rolling bearing supporting a rotary shaft with respect to a fixed housing. The rolling bearing has a first ring and a second ring in relative rotation one each other, at least one row of rolling elements being arranged between the rings. The chamber having Ethanol in liquid and/or gaseous state. The rings are coated with diamond-like carbon (DLC) material.

16 Claims, 1 Drawing Sheet

(56) References Cited

U.S. PATENT DOCUMENTS

| | | | | |
|---|---|---|---|---|
| 2005/0117827 A1* | 6/2005 | Fujii | ................... | F16C 43/06 |
| | | | | 384/510 |
| 2007/0133914 A1* | 6/2007 | Matsuyama | ........ | F16C 33/6651 |
| | | | | 384/470 |
| 2011/0223046 A1* | 9/2011 | Tinney | ................... | F01C 1/321 |
| | | | | 417/410.3 |
| 2011/0298293 A1* | 12/2011 | Veltri | ................... | F16C 39/063 |
| | | | | 307/84 |
| 2015/0030274 A1* | 1/2015 | Adane | ............... | F16C 33/6614 |
| | | | | 384/469 |
| 2017/0030410 A1* | 2/2017 | Berens | ................ | F16C 35/077 |
| 2017/0175814 A1* | 6/2017 | Ben Abdelounis | ..... | F16C 19/38 |
| 2019/0024712 A1* | 1/2019 | Yamamoto | ............ | F16C 19/386 |

FOREIGN PATENT DOCUMENTS

| | | | | | |
|---|---|---|---|---|---|
| JP | 09215256 A | * | 8/1997 | ............. | F16C 19/24 |
| JP | 2001050285 A | * | 2/2001 | ............. | F16C 33/66 |
| JP | 2004267799 A | * | 9/2004 | ............ | F16C 33/416 |
| WO | WO-2015053348 A1 | * | 4/2015 | ............. | F16C 33/44 |

\* cited by examiner

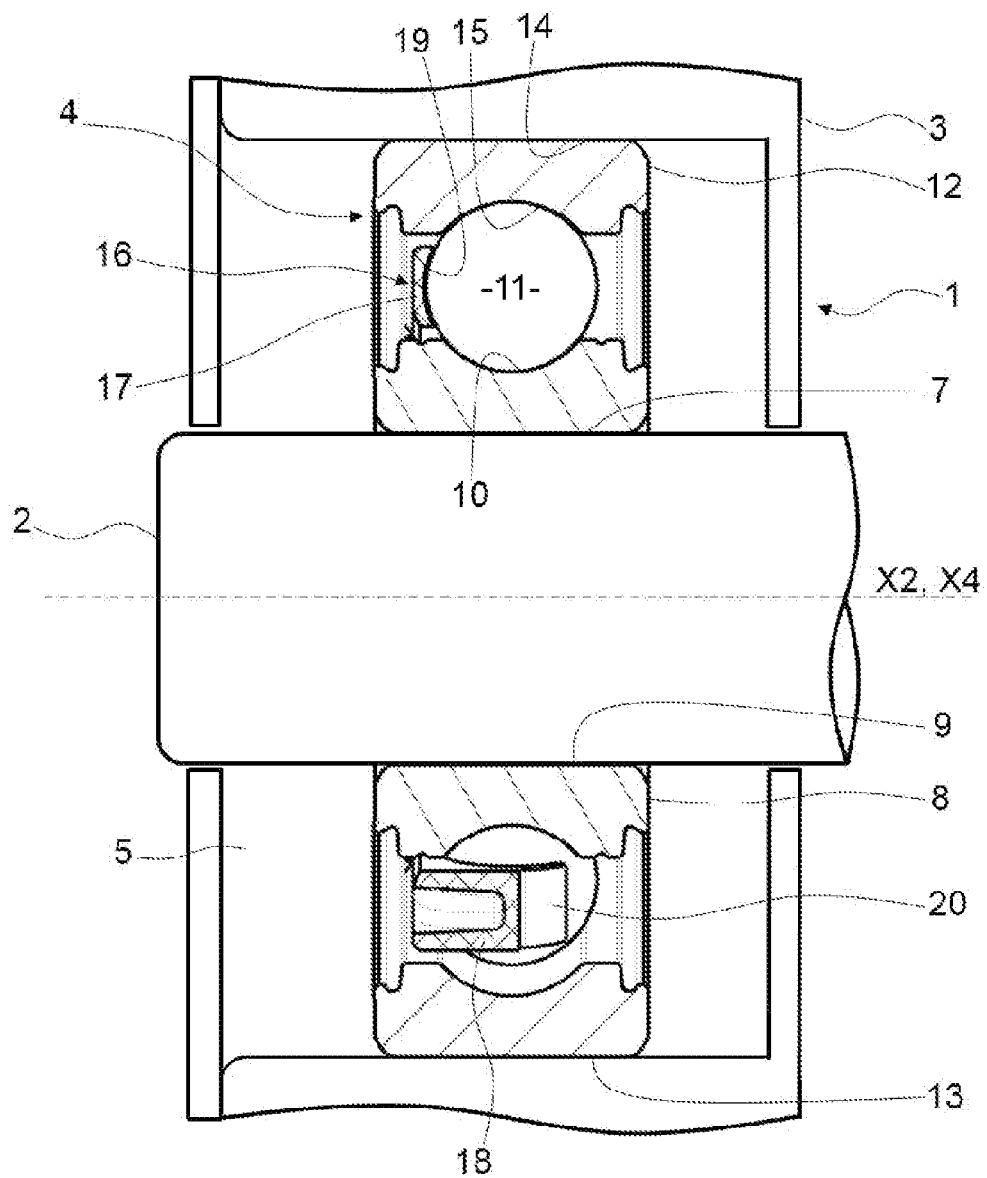

ROLLING BEARING ASSEMBLY

CROSS-REFERENCE

This application claims priority to German patent application no. 102018210091.8 filed on Jun. 21, 2018, the contents of which are fully incorporated herein by reference.

TECHNOLOGICAL FIELD

The present invention relates to a rolling bearing assembly, for use in any application with rotating parts, for example automotive vehicles, thermal and electrical motors, torque transmission devices.

BACKGROUND

A rolling bearing comprises a first ring and a second ring in relative rotation one each other, at least one row of rolling elements being arranged between the rings.

The rings may be of solid type. A solid type is to be understood as a ring obtained by machining, grinding, from a metal tube shock, bar stock, rough forgings and/or roller blanks, to provide the ring final shape and dimensions. Alternatively, the rings may be stamped and cut from a metal blank sheet.

It is known to provide a bearing assembly in a waste heat recovery unit for a motor vehicle, for example trucks. Bearing assembly comprises a rolling bearing supporting in rotation a rotary shaft with respect to a fixed housing. Waste heat recovery unit permits to convert a heated gas into a rotating movement of a steam turbine fixed to the rotary shaft. Waste heat recovery unit may use pure Ethanol for its relatively low evaporation temperature at roughly 60° C.

However, pure Ethanol is highly corrosive for the standard rolling bearing elements. In such application, it is known to provide rings made of stainless steel. Such rings are resistant to pure ethanol and ensures a longer service life with higher efficiency of the rolling bearing but are very expensive.

SUMMARY

The aim of the invention is to overcome these drawbacks by proposing a rolling bearing suitable for use with Ethanol, easy to manufacture and economic.

To this end, the invention relates to a bearing assembly comprising a chamber provided with a rolling bearing supporting in rotation a rotary shaft with respect to a fixed housing. The rolling bearing comprises a first ring and a second ring in relative rotation one each other, at least one row of rolling elements being arranged between the rings. The chamber comprises Ethanol in liquid and/or gaseous state.

According to the invention, the rings are coated with diamond-like carbon (DLC) material.

Thanks to the invention, the rings of rolling bearing are resistant to the corrosive Ethanol provided in the chamber.

Moreover, the DLC coating reduces the friction between the rolling elements and the rings, and then improves the rolling contacts and reduce the temperature of rolling bearing parts in use.

According to further aspects of the invention which are advantageous but not compulsory, such a rolling bearing may incorporate one or several of the following features:

Rolling elements are rollers or needles.
Rolling elements are balls.

The rings are made of steel, and more particularly of 100Cr6 grade.

The rolling elements are made of ceramic material.
The rolling elements are made of stainless steel.
The rolling elements are circumferentially maintained by a cage.
The cage is made of Polyether ether ketone (PEEK).

BRIEF DESCRIPTION OF THE DRAWINGS

The invention will now be explained in correspondence with the annexed FIGURE, as illustrative example, without restricting the object of the invention. The unique FIGURE is a sectional view of a deep groove ball bearing according to an embodiment of the invention.

DETAILED DESCRIPTION

The FIGURE discloses a rotating bearing assembly 1. For example, assembly 1 may be used in a waste heat recovery unit of a motor vehicle.

Assembly 1 comprises a chamber 5 defining an empty volume wherein a rolling bearing 4 supports in rotation a rotary shaft 2 with respect to a stationary housing 3. The rotary shaft 2 is of longitudinal rotating axis X2 and passes through apertures of the chamber 5. The stationary housing 3 defines the walls of chamber 5.

The chamber 5 comprises Ethanol, and more advantageously pure Ethanol, in liquid and/or gaseous state.

In the illustrated example, the rolling bearing 4 is of deep groove ball bearing type and is of longitudinal rotating axis X4. Axis X4 and X2 are common.

Rolling bearing 4 comprises an inner ring 8 with an inner cylindrical bore 9. According to one embodiment, the inner ring 8 is rotating, bore 9 being mounted on an outer cylindrical surface 7 of a rotary shaft 2. Advantageously, inner ring 8 is press fitted onto shaft end but inner ring 8 can be securely fixed to the shaft end by any other suitable fixing means. Inner ring 8 is fastened in rotation with rotary shaft 2. Inner ring 8 further comprises an outer surface provided with a concave portion 10 forming an inner raceway for a plurality of rolling elements 11.

Rolling bearing 4 comprises an outer ring 12 with an outer cylindrical surface 13 mounted in a cylindrical bore 14 of stationary housing 3. Advantageously, outer ring 12 is press fitted into housing 3 but inner ring 12 can be securely fixed to the housing 3 by any other suitable fixing means. Outer ring 12 is stationary. Outer ring 12 further comprises an inner bore provided with a concave portion 15 forming an outer raceway for a plurality of rolling elements 11.

Alternatively, the inner ring 8 may be a stationary ring, the outer ring 12 being a rotating ring.

According to the invention, the rings 8, 12 are coated with diamond-like carbon (DLC) material. Advantageously, the rings 8, 12 are made of steel, and more particularly of 100Cr6 grade. The rings 8, 12 are protected against corrosion from Ethanol in the liquid and/or gaseous state provided in the chamber 5.

Rolling elements 11, here balls, are radially arranged between raceways 10, 15 of inner and outer rings 8, 12, respectively.

Advantageously, the rolling elements 11 are made of ceramic material. Alternatively, the rolling elements 11 are made of stainless steel. Both materials can resist to the corrosive Ethanol.

Rolling elements 11 are circumferentially maintained by a cage 16. Cage 16 comprises an annular heel 17 designed to be arranged axially on one side of the rolling elements 11 and radially between the outer surface of inner ring and the inner bore of outer ring. Cage 16 further comprises a plurality of projected portions 18 that axially extend from the annular heel 17. Projected portions 18 are formed integral with heel 17 and between them delimit pockets 19 in which the rolling elements 11 are housed. Projected portions 18 form separation walls between two circumferentially adjacent pockets.

Advantageously, each of the projected portions 18 can be axially extended on its free end by a claw 20 so as to snap rolling elements 11 in a pocket 19. Alternatively, projected portions do not comprise such claws, or only a limited number of projected portions of cage comprise claws.

Advantageously, the cage 16 is made of Polyether ether ketone (PEEK). The cage 16 made in such material can resist to the corrosive Ethanol.

The present invention has been illustrated on the basis of a deep groove rolling bearing 4 for a rolling bearing assembly 1. It is also possible, without departing from the scope of the invention, to provide a rolling bearing with more than one row of rolling elements, with other types of rolling elements, and with any ring shapes.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling bearing.

Moreover, various features of the above-described representative examples, as well as the various independent and dependent claims below, may be combined in ways that are not specifically and explicitly enumerated in order to provide additional useful embodiments of the present teachings.

What is claimed is:

1. A bearing assembly comprising:
   a chamber provided with a rolling bearing that supports a rotary shaft with respect to a fixed housing,
   the rolling bearing comprising:
   a first ring having radially extending first ring axial ends,
   a second ring in relative rotation to the first ring, the second ring having radially extending second ring axial ends,
   at least one row of rolling elements being arranged between the rings, wherein the rolling elements are circumferentially maintained by a cage,
   the chamber comprising Ethanol wherein a first portion of the Ethanol being in a liquid state and a second portion of the Ethanol being in a gaseous state, the chamber being partially defined by the first and second rings such that the Ethanol is in contact with: (1) the radially extending first ring axial ends; (2) the radially extending second ring axial ends; (3) and the cage, wherein the rings are coated with diamond-like carbon (DLC) material.

2. The bearing assembly according to the claim 1, wherein the rings are made of steel of 100Cr6 grade.

3. The bearing assembly according to claim 1, wherein the rolling elements are made of ceramic material.

4. The bearing assembly according to claim 1, wherein the rolling elements are made of stainless steel.

5. The bearing assembly according to claim 1, wherein the Ethanol acts as a lubricant for the rolling elements.

6. The bearing assembly according to the claim 5, wherein the cage is made of Polyetheretherketone (PEEK).

7. A bearing assembly comprising:
   a chamber provided with a rolling bearing that supports a rotary shaft with respect to a fixed housing,
   the rolling bearing comprising:
   a first ring having radially extending first ring axial ends,
   a second ring in relative rotation to the first ring, the second ring having radially extending second ring axial ends,
   at least one row of rolling elements being arranged between the rings,
   the chamber comprising Ethanol wherein a first portion of the Ethanol being in a liquid state and a second portion of the Ethanol being in a gaseous state, the Ethanol being in contact with: (1) the radially extending first ring axial ends; and (2) the radially extending second ring axial ends, wherein the Ethanol acts as a lubricant for the rolling elements, wherein the rings are coated with diamond-like carbon (DLC) material.

8. The bearing assembly according to the claim 7, wherein the rings are made of steel of 100Cr6 grade.

9. The bearing assembly according to claim 7, wherein the rolling elements are made of ceramic material.

10. The bearing assembly according to the claim 9, wherein the rolling elements are circumferentially maintained by a cage, the cage is made of Polyetheretherketone (PEEK).

11. The bearing assembly according to claim 7, wherein the rolling elements are made of stainless steel.

12. A bearing assembly comprising:
    a chamber provided with a rolling bearing that supports a rotary shaft with respect to a fixed housing,
    the rolling bearing comprising:
    a first ring having radially extending first ring axial ends,
    a second ring in relative rotation to the first ring, the second ring having radially extending second ring axial ends,
    at least one row of rolling elements being arranged between the rings,
    the chamber comprising Ethanol in a liquid state, the Ethanol being in contact with: (1) the radially extending first ring axial ends; and (2) the radially extending second ring axial ends, wherein the Ethanol acts as a lubricant for the rolling elements, wherein the rings are coated with diamond-like carbon (DLC) material.

13. The bearing assembly according to the claim 12, wherein the rings are made of steel of 100Cr6 grade.

14. The bearing assembly according to claim 12, wherein the rolling elements are made of ceramic material.

15. The bearing assembly according to claim 14, wherein the rolling elements are circumferentially maintained by a cage, the cage is made of Polyetheretherketone (PEEK).

16. The bearing assembly according to claim 12, wherein the rolling elements are made of stainless steel.

* * * * *